United States Patent
Bahlmann et al.

(10) Patent No.: US 6,170,008 B1
(45) Date of Patent: Jan. 2, 2001

(54) ON-THE-FLY TRIVIAL FILE TRANSFER PROTOCOL

(75) Inventors: Bruce F. Bahlmann, Waverly, IA (US); Brian Field, Boulder; Chris F. Melle, Longmont, both of CO (US)

(73) Assignee: Mediaone Group, Inc., Englewood, CO (US)

( * ) Notice: Under 35 U.S.C. 154(b), the term of this patent shall be extended for 0 days.

(21) Appl. No.: 09/206,920

(22) Filed: Dec. 7, 1998

(51) Int. Cl.[7] ................................................. G06F 13/00
(52) U.S. Cl. .................... 709/220; 709/228; 709/230; 709/250; 713/2
(58) Field of Search .................... 709/220, 221, 709/222, 223, 225, 226, 227, 228, 230, 237, 250; 713/1, 2

(56) References Cited

U.S. PATENT DOCUMENTS

| | | | |
|---|---|---|---|
| 5,790,548 | * 8/1998 | Sistanizadeh et al. | 370/401 |
| 5,974,547 | * 10/1999 | Klimenko | 713/2 |
| 6,070,187 | * 5/2000 | Subramaniam et al. | 709/220 |

* cited by examiner

Primary Examiner—Viet D. Vu
(74) Attorney, Agent, or Firm—Brooks & Kushman P.C.

(57) ABSTRACT

A network server, and a method for building a boot file in response to a standard protocol request. Network specific and client specific parameters necessary to build the boot file are encoded into the path name and file name of the standard protocol request respectively. A special character in the standard protocol request triggers the network server to decode the parameters from the standard protocol request and then use the decoded parameters to build the boot file on-the-fly.

29 Claims, 2 Drawing Sheets

ON-THE-FLY TRIVIAL FILE TRANSFER PROTOCOL

TECHNICAL FIELD

The present invention relates to the field of building boot files in a network server using network specific and client specific parameters encoded in a standard protocol request.

BACKGROUND ART

The use of a Trivial File Transfer Protocol (TFTP) and boot files began with the "classic" Bootstrap Protocol (BOOTP). In classic BOOTP, when a client logs on a network, it is directed to a TFTP server for downloading of a boot file that is unique for that client. The TFTP server receives requests from the clients, looks up the clients in a table, and if there is a match the TFTP server downloads the contents of the boot file to the client. The boot files usually reside in the TFTP home directory. As the number of computer networks and the number of clients on each network expands, the classic BOOTP approach creates a bottleneck. Not only are the boot files unique to the client, they are also unique to the network the client is using. This means that for each client, and for each network that the client can log onto, there must be one unique boot file. The sum of all of the individual boot files can require a large amount of storage in the server.

Analysis of the boot files used in classic BOOTP has shown that all of the clients in the same class of service on the same network have identical configuration information. This permits all of the clients in one service class on one network to have their configuration information stored as a single shared boot file. The server then downloads the shared boot file according to the network and service class that the client came from. Additional server storage reductions can be achieved using a standard naming convention for the shared boot files, and storing them in a directory structure that is unique for each network and/or each class of service.

The shared boot file approach is susceptible to scaling problems associated with updates in the number of networks, the number of service classes, the number of features within a service class, new network equipment, and redundancy requirements. Increases in the number of networks cause an increase in the number of shared boot files that the TFTP servers must store. Likewise, an increase in the number of service classes causes an increase in the number of shared boot files. Where the number of features available to the client increases, the size of each file supporting the new features increases, thus requiring even more storage in the TFTP server. In addition, the server administrators must retool the code that creates the boot files from the shared boot files to enable each new release of features for the clients. New network equipment operating according to new standards also requires the creation of new support files. Finally, where the clients require redundant TFTP servers, the server administrators must synchronize the files in each TFTP server so that all of the servers have the same version of the files. All these situations require either additional hard drive space to be added to the TFTP servers and/or additional administrative efforts to account for any expansions or changes.

DISCLOSURE OF INVENTION

The present invention provides a network server, and a method for building a boot file in response to a standard protocol request. Network specific and client specific parameters necessary to build the boot file are encoded into the path name and file name of the standard protocol request respectively. A special character in the standard protocol request triggers the network server to decode the parameters from the standard protocol request and then use the decoded parameters to build the boot file on-the-fly.

Accordingly, it is an object of the present invention to provide a network server and method for building a boot file in response to a standard protocol request. Another object of the present invention is that the standard protocol request has a special character, one or more network specific parameters, and one or more client specific parameters. Another object of the invention is to check for the special character in the request. Another object of the invention is to extract the network specific and client specific parameters from the request. Another object is to provide server configuration information which contains additional parameters. The client specific parameters are then used to index additional parameters from a server configuration information. Still another object of the present invention is the assembling of the boot file using the network specific parameters, the client specific parameters, and the additional parameters.

These and other objects, features and advantages will be readily apparent upon consideration of the following detailed description in conjunction with the accompanying drawings.

BEST MODE FOR CARRYING OUT THE INVENTION

Figure 1:
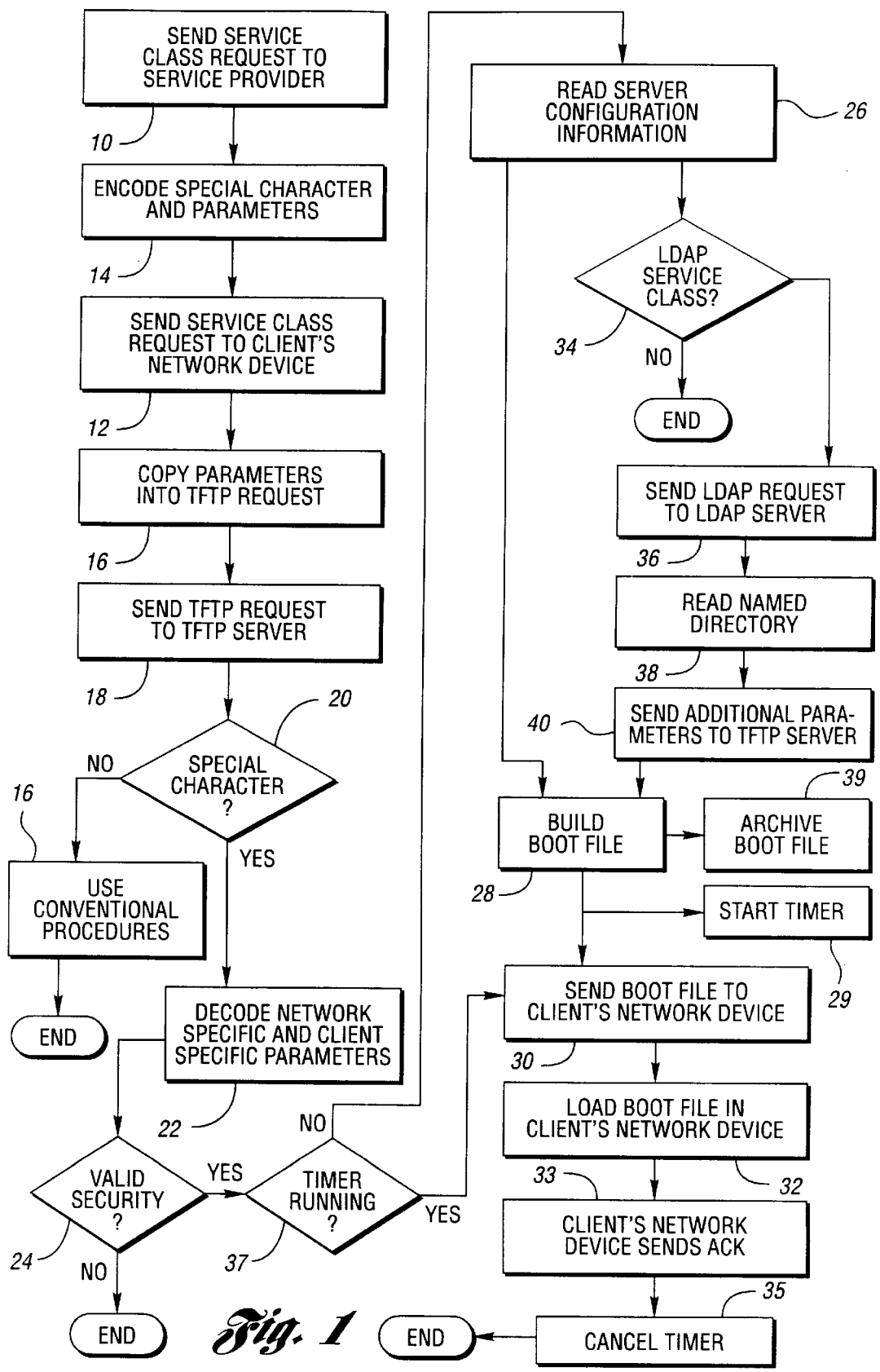
FIG. 1 is a flow diagram of the sequence of events starting with the client requesting a class of service and ending with the loading of the boot file in the client's network device.

FIG. 1 illustrates the sequence of events involved in building a boot file on-the-fly. An Internet Architecture Board (IAB) defines standards used below in Standard protocols (STD) and Request For Comments (RFC) documents. A client initiates the sequence by requesting 10 a class of service from a service provider, for example a Dynamic Host Configuration Protocol (DHCP) (IAB draft standard protocol RFC 2132) server or a Bootstrap Protocol (BOOTP) (IAB draft standard protocol RFC 2131) server. When the client first signs-on with the service provider, the first service class requested is for a default class. The default class allows the client limited scope. For example, the default class may allow a connection to a File Transfer Protocol (IAB standard protocol STD 9) server to download an Internet browser, and a connection to a registration web site. Once the service provider has authenticated the client, the client can request other service classes for which it subscribes.

For each valid service class request 10 from a client, the service provider will issue a response 12. The response 12 typically takes on the form of a BOOTP response or a DHCP response. A feature common in BOOTP and DHCP enables file names and path names used in the response to be defined independent of each other. The present invention uses this capability to encode 14 a special character and network specific information about the client in the path name, and client specific parameters in the file name of the response. These parameters provide most of the information required to build a customized boot file for each client. Also, security information, such as a check sum of the parameters, or an encrypted password keyed to the other parameters, can be included in the response. The security information will ultimately be used by a Trivial File Transfer Protocol (TFTP) (IAB standard protocol STD 33) server to validate a TFTP request.

Since many types of devices use the TFTP with either BOOTP or DHCP, the present invention structures the way the information is encoded in the BOOTP/DHCP response to account for the different vendor needs. The preferred structure of the path name is:

path name=/special character/<network specific parameters>

Where:

Special character is a unique character that triggers boot file building on-the-fly.

Network specific parameters are one or more parameters delimited by a slash "/".

The preferred structure for the file name is:

file name=/vendor identification/network device type/boot file type/<additional client specific parameters>

Where:

Vendor identification identifies the manufacturer of the network device being used by the client.

Network device type identifies the particular model of the network device.

Boot file type identifies the type of boot file the network device is expecting. (Text, Message Digest Algorithm 5 (MD5), or similar.)

Additional client specific parameters are one or more parameters delimited by a slash "/".

An example of the path name and file name for a cable modem are:

path name=/%/24.128.24.1/23/26.75/541/512 file name=/bayn/cm/md5/res01/secure/2/7896425

Where:

% is the special character.

24.128.24.1 is a gateway address.

23 is the subnet mask of the network in bits.

26.75 is the transmit frequency.

541 is the receive frequency.

512 is the loop delay.

bayn is the name of the vendor (Bay Networks).

cm represents a Bay Networks cable modem.

md5 indicates an MD5 type of boot file.

res01 is the customer's service class (residential 1).

secure is the filter option selected by the customer.

2 represents the number of connections needed at the customer's site.

7896425 is a check sum used for security purposes.

An example of the path name and file name for a router are:

path name=/%/24.128.24.1/23/26.75/541/512 file name=/cisco/rr/txt/co.xyz/24.128.7.65/28

Where:

% is the special character.

24.128.24.1 is a gateway address.

23 is the subnet mask of the network in bits.

26.75 is the transmit frequency.

541 is the receive frequency.

512 is the loop delay.

cisco is the name of the vendor (Cisco Systems).

rr indicates a residential router.

txt indicates a text type of boot file.

co.xyz is the router's host name.

24.128.7.65 is the network address of the customer side subnet.

28 is the subnet mask of the customer side subnet.

Other types of network devices which use the TFTP include network computers, workstations, legacy cable modems, Digital Subscriber Line modems, and Data Over Cable Service Interface Specification (DOCSIS) cable modems.

When the client's network device (e.g., a router, a cable modem, or another interface device) receives the service class response, it stores the encoded special character, the network specific information and the client specific information. From this point, the network device will copy 16 the special character, the network specific information and the client specific information into any TFTP request initiated by the client. (Copying the response data into the TFTP request is the current behavior of the network devices so the network devices do not require modification to support the present invention.) The network device then makes the TFTP request 18 to the TFTP server.

The server receiving the TFTP request checks, decision block 20, for the presence of the special character. If the special character is not present, the server uses its conventional procedures 21 to generate the boot file response. When the special character is present, the server decodes 22 the network specific information from the path name, and the client specific information from the file name from the TFTP request.

Where the provisioning server has provided a security parameter, the TFTP server checks, decision block 24, the security information encoded in the TFTP request. The server will accept the TFTP request only if the security information is valid. The security information helps prevent clients from accessing unauthorized services. This information makes it very difficult for the client to modify the service class parameter, or any other parameter in the response from the provisioning server. For example, a client may request one class of service from a provisioning server. After receipt of the response, the client may easily change the service class parameter to a premium service class. However, the provisioning server may add a checksum to the response. The provisioning server should calculate the checksum based on specified network specific parameter, client specific parameters, and a "secret" value. The secret value is known only by the provisioning and TFTP servers. Since the client does not know the secret value, it cannot modify the checksum to account for the changed service class parameter value. As a result, the TFTP server can validate that no unauthorized option modifications have occurred by verifying that the checksum provided can be derived from the supplied parameters and secret value.

Based upon the file name parameters, the TFTP server reads 26 additional parameters from server configuration information stored in the server. These additional parameters may be dependent on the vendor type, device type, boot file type and additional client specific parameters from the TFTP request. They may also include one or more default values common to all clients, common to all device types of a specific vendor, or common to other factors. The server configuration information may also contain information regarding the structure of the boot file. Finally, the server configuration information may also contain a sequence by which the TFTP server is to build the boot file.

Using the network specific parameters and client specific parameters decoded from the TFTP request, and the other parameters read from the server configuration information, the TFTP server builds the boot file 28. The server then sends 30 the boot file back to the client where it is loaded 32 in the client's network device. If the client's network device has not time-out by the time the boot file arrives it will send an acknowledgment 33, completing a normal sequence.

An optional feature may be included in the server which shortens the server's response time in situations where the client's network device does time out. When the server sends the boot file to the client, the server retains a copy of the boot file, and starts a timer 29 for a predetermined amount of time. The predetermined amount of time is specified in the server configuration information. As stated before, if the client receives the boot file before timing-out, an acknowledgment will be sent 33. When the acknowledgment is received back at the server, the timer is canceled 35. If the client times-out before receiving the boot file it will not send the acknowledgment. Instead, the client will make another attempt to obtain the boot file. If this retry occurs while the timer is running, decision block 37, the server will resend the previously built boot file rather than building a new one.

In another option, the TFTP server may archive the boot files 39 that it sends in response to the activation of a debug setting or similar command.

In some situations the TFTP request cannot hold all of the parameters needed by the TFTP server to build the boot file on-the-fly. For example, in small business or power user environments, the client may have many network devices (e.g., computers, printers, etc.) which could potentially interface to the Internet through a cable modem. However, the client may wish to pay for a service class in which only select devices are permitted Internet access. Stuffing the medium access control (MAC) addresses of the selected network devices into the configuration file of the network's cable modem can enforce this restriction. However, where the client has sixteen selected network devices, then twelve MAC address characters per network device produces 192 or more characters to identify just the MAC addresses. When combined with the other network specific parameters and client specific parameters that need to be included in the TFTP request, the 255-character limit of the TFTP request may be easily exceeded.

To account for these small businesses and power user clients, the present invention uses the Lightweight Directory Access Protocol (LDAP) (IAB proposed standard protocol RFC 2251) to supply the additional parameters to the TFTP server from a directory access protocol server. A service class parameter with an "LDAP" value, a "special directory" value, or another unique value, and a client identification parameter are copied 16 into the file name of the TFTP request by the network device. After the TFTP server reads 26 the server configuration information, it checks, decision block 34, for the presence of the service class parameter with the "LDAP" value. When the TFTP server recognizes the LDAP service class, it sends 36 the client identification parameter, password, and a directory name to an LDAP server. The LDAP server uses the client identification parameter to read 38 the named directory containing the additional parameters. The LDAP server sends 40 these additional parameters back to the TFTP server where they are incorporated into the boot file 28.

Figure 2:
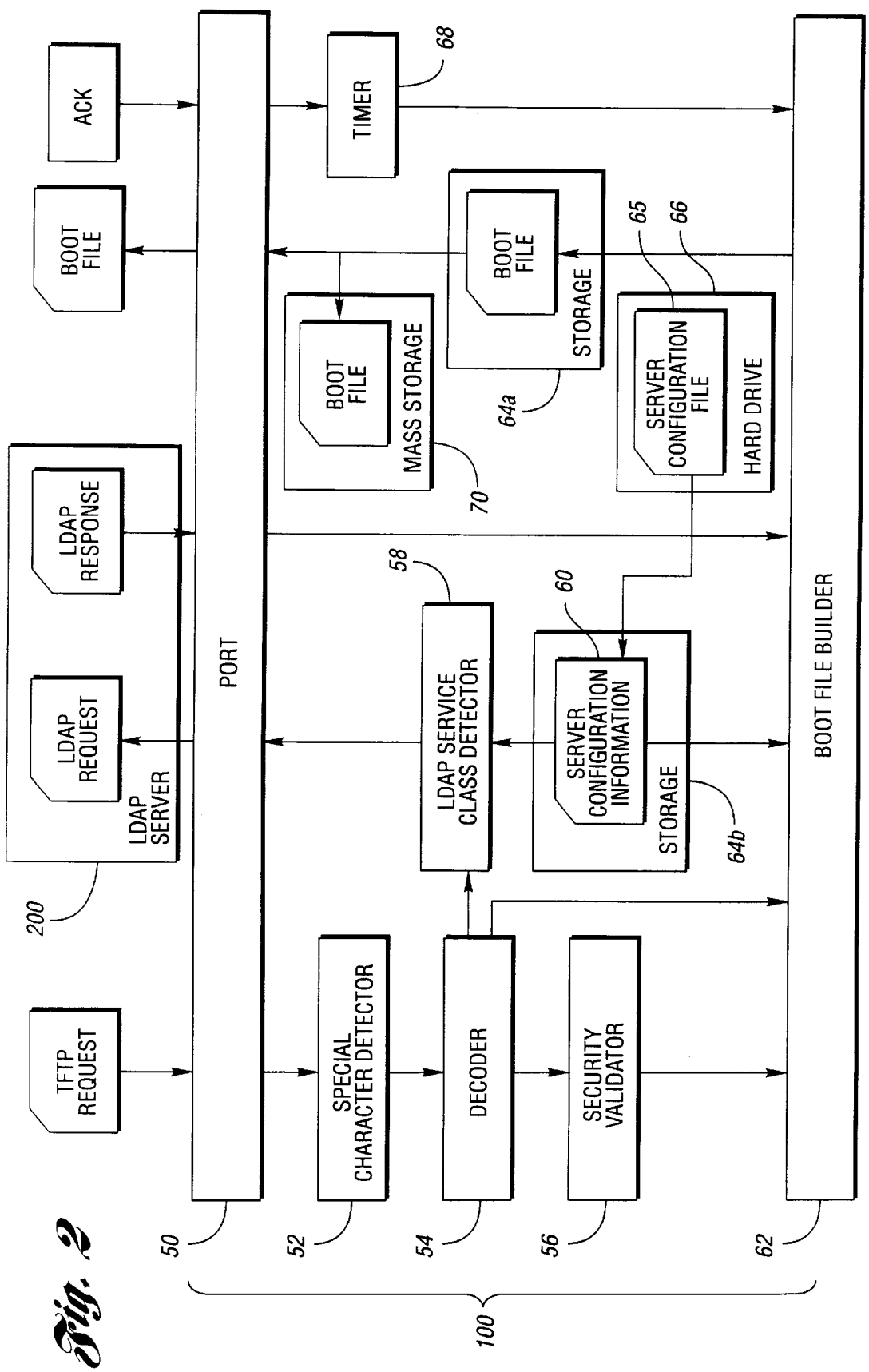
FIG. 2 is a schematic of a server that implements the on-the-fly boot file build.

FIG. 2 is a schematic of a TFTP server 100 that implements the on-the-fly boot file build of the present intention. The TFTP server 100 receives the TFTP request from the network at a port 50. The port 50 is connected to a special character detector 52. The port 50 passes the TFTP request to the special character detector 52 which checks for the presence of the special character. The special character detector 52 is connected to a decoder 54. When the special character detector 52 detects the presence of the special character in the TFTP request, it passes the TFTP request to the decoder 54 to extract the network specific parameters and the client specific parameters. A security validator 56, connected to the decoder 54, checks any security parameters encoded in the request. If the security information is valid, the security validator 56 allows processing of the TFTP request to continue. If the security information is invalid, the security validator 56 rejects the TFTP request. An LDAP service class detector 58 is connected to the decoder 54, the port 50, and can read from the server configuration information 60. The LDAP service class detector 58 checks the client specific parameters for the presence of a service class parameter having a value of "LDAP." When the LDAP service class detector 58 recognizes this situation, the server assembles the client identification parameter, and other information obtained from the server configuration information 60 (e.g., IP address, port number, directory name and password) into an LDAP request. The port 50 then sends the LDAP request to an LDAP server 200. In return, the port 50 receives a response from the LDAP server 200 containing additional parameters. A boot file builder 62 is connected to the port 50, the decoder 54, the security validator 56, can read information from the server configuration information 60, and can write to storage 64*a*–64*b*. The boot file builder 62 uses the network specific parameters and the client specific parameters it receives from the security validator 56, and any additional parameters received from the LDAP sever 200 via the port 50 to assemble the boot file in storage 64*a*. The boot file builder 62 only builds the boot file when it receives an indication from the security validator 56 that the TFTP request is valid. Where appropriate, the boot file builder 62 uses some of the parameters decoded from the TFTP request to index additional parameters from the server configuration information 60. The TFTP server stores the server configuration information 60 in storage 64*b*. The storage 64*a*–64*b* is also in communication with the port 50. Finally, the TFTP server copies the boot file from storage 64*a* to the port 50 where it is transmitted back to the client.

Total response time from the receipt of the TFTP request at the TFTP server 100, to the receipt of the boot file response at the client's network device must be shorter than the client's time-out period. Encoding the network specific parameters and the client specific parameters into the TFTP request helps shorten the response time by making this information available as part of the request. To shorten the response time further, it is preferred that the TFTP server 100 builds the boot file in a random access memory type storage 64*a*.

To account for situations where the boot file build requires longer time than the client's time-out period the TFTP server 100 may include a timer 68. The timer 68 starts running when the boot file is transmitted back to the network device. While the timer 68 is running, the boot file is retained in storage 64*a*. If the client acknowledges receipt of the boot file, then the timer 68 informs the boot file builder 62 that the boot file in storage 64*a* is no longer required. If the client does not acknowledge receipt of the boot file, and instead repeats the TFTP request, then the boot file builder 62 will not rebuild the boot file already in storage 64*a*. If the client fails to acknowledge the receipt of the boot file and sends no additional requests then the timer 68 continues running until it times-out. Once the timer has timed-out, and subsequent TFTP requests received at the TFTP server 100 will result in the boot file builder 62 building a new boot file.

To aid in the debugging of the network, the TFTP server 100 may include a mass storage device 70 such as a tape drive, hard-drive, writeable compact disk, or similar device for storing copies of the boot files.

The network device vendors and the service providers determine the server configuration information 60 within a server configuration file 65 that is stored on the hard drive 66 in the TFTP server 100. (The server configuration information 60 is copied to random access memory type storage 64b when the TFTP server 100 boots.) The network device vendors must determine which of their products will support the on-the-fly boot file functionality per the present invention. For those products that will support this functionality, the vendors must supply any default parameters required in the boot file. The service providers must establish the order and names of path name parameters, order and names of file name parameters, service classes, filter options, MD5 type boot file default keys, and the meaning and values of other parameters. An example of a configuration file supporting the cable modem and router discussed above is as follows:

```
On-The-Fly Trivial File Transfer Protocol server configuration file predefined structures
define path name
#parameter              position in path name
special_character      1
define file name
#parameter              position in file name
vendor_id              1
net_device_type        2
boot_file_type         3
define ldap
#parameter              position in LDAP request
ldap_server_ip         1         #IP address of LDAP server
ldap_port              2         #Port number
base_dn                3         #Base directory name
client_id              4         #Client identification
password               5         #Password
#define special_character
special_character      %
#define vendors
#Bay Networks
vendor_id              bayn      #Bay Networks
net_device_type        cm        #Cable modem
#structure of additional network specific parameter
#parameter              position in path name
client_gw              2         #Client gateway
nsubnet_mask           3         #Subnet mask of the network
xmit_freq              4         #Transmit frequency
xrcv_freq              5         #Receive frequency
loop_delay             6         #Loop delay
#structure of additional client specific parameters
#parameter              position in file name
service_class          4         #Service Class
filtering_level        5         #Filtering selected for customer
max_nodes              6         #Maximum number of connections
security               7         #Security information
define defaultkey
md5_key                12345     #Up to 64 bit key
decipher service_class
#name   down    up      prior   burst   headend_node
res01   1500    300     3       1       no      #Residential 1 service
                                                 class
res02   1500    1500    3       2       no      #Residential 2 service
                                                 class
hn      10000   10000   1       4       yes     #Headend node service
                                                 class
ldap    _       _       _       _       _       #LDAP required
decipher filtering_level
#name           x       y       z
secure          1       2       3       #Secure filter
ip_address      1       7       7       #IP address filter
none            _       _       _       #No filter required
#default parameters
join_network   yes              #
```

```
SNMP_RO         no                      #Simple Network Management
                                         Protocol
max_CDMs        512                     #Maximum number of Cable Data
                                         Modems
min_content     15                      #
read_comm       MediaOne                #
write_comm      Express                 #
manager_IP      24.128.28.2             #Manager IP address
manager_eth     11:22:33:44:55:66       #Manager Ethernet address
client_IP       24.128.24.1             #Client IP address
client_eth      none                    #Client Ethernet address
encryption      off                     #
off_net_gw      no                      #Off net gateway
key_server      12.100.30.3             #
encry_nets      none                    #
sw_revision     2.1                     #
TFTP_IP         10.114.18.1             #Default TFTP server IP address
time_out        100                     #Time out period of network device
#build sequence of a boot file (an MD5 type file)
define buildorder
xmit_freq, xrcv_freq, loop_delay, nsubnet_bits, client_gateway,
join_networks, SNMP_RO, max_CDMs, min_content, read_comm,
write_comm, manager_IP, manager_eth, client_IP, client_eth,
encryption, off_net_gw, key_server, encry_nets, sw_revision,
TFTP_IP, time_out, service class, filtering_level, max_nodes,
md5_key
#position of parameters in the boot file
define content
xmit_freq, xrcv_freq, loop_delay, nsubnet_bits, client_gateway,
join_networks, SNMP_RO, max_CDMs, min_content, read_comm,
write_comm, manager_IP, manager_eth, client_IP, client_eth,
encryption, off_net_gw, key_server, encry_nets, sw_revision,
TFTP_IP, time_out, service class, filtering_level, max_nodes,
md5_key
#end Bay Networks
#Cisco Systems
vendor_id               cisco   #Cisco Systems
net_device_type         rr      #Residential Router
#structure of additional network specific parameters
#parameter              position in path name
client_gw               2       #Client gateway
nsubnet_mask            3       #Subnet mask of the network
xmit_freq               4       #Transmit frequency
xrcv_freq               5       #Receive frequency
loop_delay              6       #Loop delay
#structure of additional client specific parameters
#parameter              position in TFTP request
hostname                4       #Host name
client_gw               5       #Network address of customer side subnet
csubnet_mask            6       #Subnet mask of customer side subnet
#default parameters
none
#build sequence of the boot file
define buildorder
none
#position of parameters in the boot file (a text type file)
define content
!
version 11.1
service password-encryption
service udp-small-servers
service tcp-small-servers
!
hostname <hostname>
enable secret 5 $#@%
enable password 7 0201 001
!
interface Ethernet0
    ip address <client_ip><nsubnet_mask>
    ip rip send version 2
!
interface Ethernet1
    ip address <client_gw><csubnet_mask>
!
interface Serial0
    no ip address
    shutdown
!
interface Serial1
```

-continued

```
 no ip address
 shutdown
!
router rip
 version 2
 network 24.0.0.0
 no auto-summary
!
ip classless
ip route 0.0.0.0 0.0.0.0 Ethernet0
snmp-server community 1234 R0
!
line con 0
lin aux 0
line vty 0 4
 password 7 0438290
 login
!
#end Cisco Systems
```

While embodiments of the invention have been illustrated and described, it is not intended that these embodiments illustrate and describe all possible forms of the invention. Rather, the words used in the specification are words of description rather than limitation, and that various changes may be made without departing from the spirit and scope of the invention.

What is claimed is:

1. A method of providing a boot file to a network device in response to a standard protocol request initiated by a client from the network device, the method comprises:
 transmitting the standard protocol request from the network device to a standard protocol server, the standard protocol request having at least one network specific parameter, at least one client specific parameter, and a special character, the special character notifies the standard protocol server that the standard protocol request contains the at least one network specific parameter and the at least one client specific parameter;
 checking by the standard protocol server for the special character in the standard protocol request;
 decoding the at least one network specific parameter and the at least one client specific parameter from the standard protocol request in response to recognizing the special character;
 reading at least two additional parameters from a server configuration information based upon the at least one client specific parameter in response to decoding the at least one client specific parameter;
 building the boot file using the received at least one network specific parameter, the at least one client specific parameter, and the at least two additional parameters; and
 providing the boot file to the network device.

2. The method of claim 1 wherein the standard protocol request includes a path name and a file name, the method further comprising: encoding the special character and the at least one network specific parameter in the path name, and encoding the at least one client specific parameter in the file name in the standard protocol request.

3. The method of claim 1 wherein the server configuration information includes a boot file build sequence, the method further comprising;
 reading the boot file build sequence from the server configuration information in response to decoding the at least one client specific parameter; and
 wherein the step of building the boot file includes building the boot file using the boot file build sequence read from the server configuration information.

4. The method of claim 1 wherein the server configuration information includes a boot file structure, the method further comprising:
 reading the boot file structure from the server configuration information in response to decoding the at least one client specific parameter; and
 wherein the step of building the boot file includes building the boot file using the boot file build structure read from the server configuration information.

5. The method of claim 1 wherein the at least two additional parameters includes at least one default value.

6. The method of claim 1 further comprising:
 transmitting a service class request from the network device to a provisioning server prior to transmitting the standard protocol request from the network device to the standard protocol server;
 transmitting a service class response from the provisioning server to the network device, the service class response having the special character, at least one network specific parameter and the at least one client specific parameter appropriate for the. service class request; and
 copying the special character, the at least one network specific parameter and the at least one client specific parameter contained in the service class response into the standard protocol request prior to transmitting the standard protocol request.

7. The method of claim 6 wherein the service class response includes a path name and a file name, the method further comprises:
 encoding the special character and the at least one network specific parameter in the path name, and encoding the at least one client specific parameter in the file name prior to transmitting the service class response to the network device.

8. The method of claim 7 wherein the service class response is selected from the group of responses comprising Bootstrap Protocol and Dynamic Host Configuration Protocol.

9. The method of claim 1 wherein the at least one client specific parameter includes a vendor identification parameter, a network device type parameter, a boot file type parameter, and at least one additional parameter.

10. The method of claim 9 wherein the at least one additional parameter includes a service class parameter and a customer identification parameter, the service class parameter having a plurality of possible values including a special directory value, the special directory value indicating that a plurality of parameters necessary to build the boot file are stored in a directory in a directory access protocol server and indexed by the customer identification parameter, the method further comprises:
 checking the service class parameter for the special directory value after decoding the at least one client specific parameter;
 transmitting the customer identification parameter from the special protocol server to the directory access protocol server in response to recognizing the special directory value in the service class parameter;
 reading the plurality of parameters associated with the customer identification parameter from the directory in response to receiving the customer identification parameter by the directory access protocol server;
 transmitting the plurality of parameters read from the directory access protocol server to the standard protocol server; and wherein the step of building the boot file includes incorporating the plurality of parameters transmitted from the directory access protocol server.

11. The method of claim 10 wherein the directory access protocol server is a Lightweight Directory Access Protocol server.

12. The method of claim 1 wherein the boot file is built in a random access memory.

13. The method of claim 1 wherein the standard protocol request includes at least one security parameter, the method further comprises:

decoding the at least one security parameter in addition to decoding the at least one network specific parameter and the at least one client specific parameter; and validating the decoded at least one security parameter prior to reading the at least two additional parameters from the server configuration information.

14. The method of claim 1 wherein the standard protocol request is a Trivial File Transfer Protocol request and the standard protocol server is a Trivial File Transfer Protocol server.

15. The method of claim 1 further comprising:

starting a timer in the standard protocol server in response to providing the boot file to the network device;

sending an acknowledgment from the network device to the standard protocol server in response to receiving the boot file at the network device;

canceling the timer in response to receiving the acknowledgment from the network device at the standard protocol server; and providing the boot file to the network device again if the standard protocol request is received again at the standard protocol server while the timer is running and prior to receiving the acknowledgment.

16. The method of claim 1 further comprising archiving the boot file in response to providing the boot file to the network device.

17. A standard protocol server which builds a boot file in response to a standard protocol request received from a network device, the standard protocol request having a special character, at least one network specific parameter, and at least one client specific parameter, an improvement comprises:

a first detector in communication with the network device, the first detector detects a presence of the special character in the standard protocol request, the presence of the special character indicates that the standard protocol request contains the at least one network specific parameter and the at least one client specific parameter;

a decoder connected to the first detector, the decoder extracts the at least one network specific parameter and the at least one client specific parameter from the standard protocol request in response to the detection of the special character;

a server configuration information, the server configuration information having at least two additional parameters indexed by the at least one client specific parameter; and a boot file builder connected to the decoder and having access to the server configuration information, the boot file builder assembling the boot file using the at least one network specific parameter, the at least one client specific parameter, and the at least two additional parameters.

18. The standard protocol server of claim 17 further comprising a random access memory connected to the boot file builder, the random access memory holds the boot file as it is being assembled by the boot file builder.

19. The standard protocol server of claim 17 wherein the standard protocol request has a path name and a file name, and the special character and the at least one network specific parameter are encoded in the path name, and the at least one client specific parameter is encoded in the file name.

20. The standard protocol server of claim 17 wherein the server configuration information contains a sequence for assembling the boot file, and wherein the boot file builder assembles the boot file in accordance with the sequence contained in the server configuration information.

21. The standard protocol server of claim 17 wherein the server configuration information contains a structure for assembling the boot file, and wherein the boot file builder assembles the boot file in accordance with the structure contained in the server configuration information.

22. The standard protocol server of claim 17 wherein the at least two additional parameters includes at least one default value.

23. The standard protocol server of claim 17 wherein the at least one client specific parameter includes a vendor identification parameter, a network device type parameter, a boot file type parameter, and at least one additional parameter.

24. The standard protocol server of claim 23 further including a directory access protocol server, wherein the at least one additional parameter includes a service class parameter and a customer identification parameter, the service class parameter having a plurality of possible values including a special directory value, the special directory value indicates that a plurality of parameters necessary to build the boot file are stored in the directory access protocol server and indexed by the customer identification parameter, the standard protocol server further comprising:

a second detector connected to the decoder for detecting the presence of the special directory value in the service class parameter;

a port connected between the second detector, the boot file builder, and the directory access protocol server, the port being responsive to the detection of the special directory value by the second detector to send the plurality of parameters from the directory access protocol server to the boot file builder; and wherein the boot file builder incorporates the plurality of parameters received from the directory access protocol server into the boot file.

25. The standard protocol server of claim 24 wherein the directory access protocol server is a Lightweight Directory Access Protocol server.

26. The standard protocol server of claim 17 wherein the standard protocol request includes at least one security parameter, and wherein the decoder further extracts the at least one security parameter from the standard protocol request, the server further comprises a validator connected between the detector and the boot file builder, the validator validates the at least one security parameter extracted from the standard protocol request extracted by the decoder, and instructs the boot file builder to assemble the boot file when the at least one security parameter is valid.

27. The standard protocol server of claim 17 wherein the standard protocol request is a Trivial File Transfer Protocol request and the standard protocol server is a Trivial File Transfer Protocol server.

28. The standard protocol server of claim 17 wherein the network device sends an acknowledgment in response to receiving the boot file, the standard protocol server further comprising:
- a timer connected to the boot file builder, the timer starts running when the boot file builder finishes assembling the boot file, the timer is canceled when the acknowledgment is received from the network device, and the timer times-out after a predetermined amount of time; and
- wherein the boot file builder also retains the boot file as long as the timer is running, and will transmit the boot file to the network device in response to a subsequently received standard protocol request prior to the timer timing out.

29. The standard protocol server of claim 17 further comprising a mass storage for archiving all boot files.

* * * * *

UNITED STATES PATENT AND TRADEMARK OFFICE
CERTIFICATE OF CORRECTION

PATENT NO. : 6,170,008 B1
DATED : January 2, 2001
INVENTOR(S) : Bruce F. Bahlmann, Brian Field and Chris F. Melle It is certified that error appears in the above-identified patent and that said Letters Patent is hereby corrected as shown below:

<u>Title page, Item [54] and Column 1, line 2,</u>
Title, after "PROTOCOL" insert -- SERVER --.

<u>Column 9,</u>
Line 61, after "comprising" delete ";" and insert -- : --.

Signed and Sealed this

Twenty-fourth Day of August, 2004

JON W. DUDAS
*Director of the United States Patent and Trademark Office*